Figure 4:
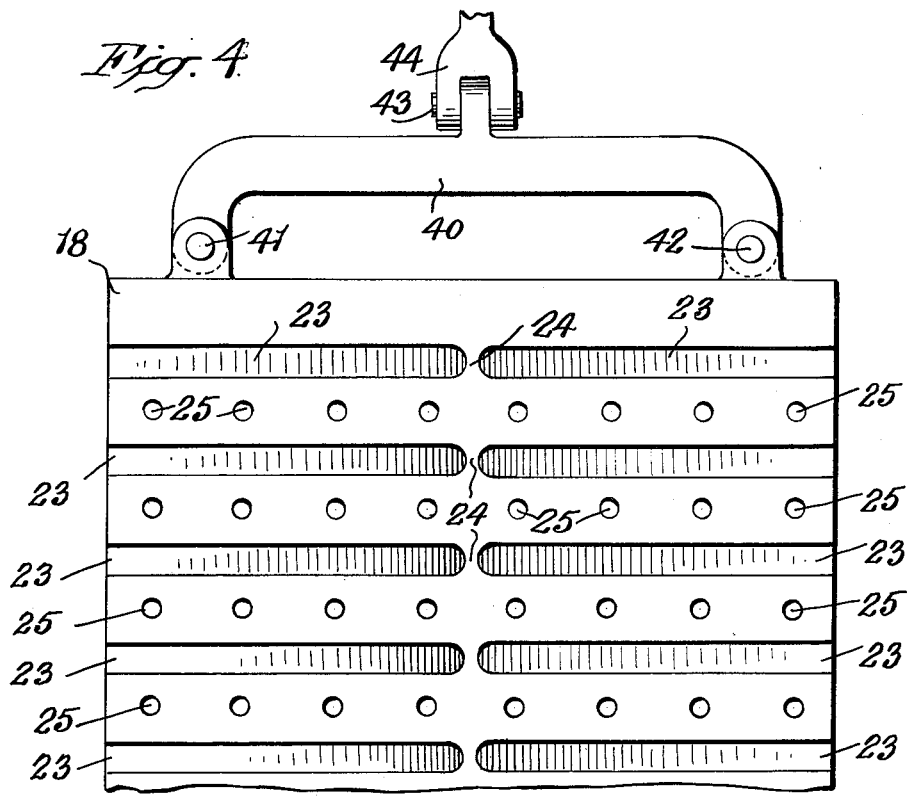

May 20, 1952  G. S. PERKINS  2,597,175
DEPOSITOR FOR CONFECTIONERY MACHINES
Filed March 16, 1949  3 Sheets-Sheet 1
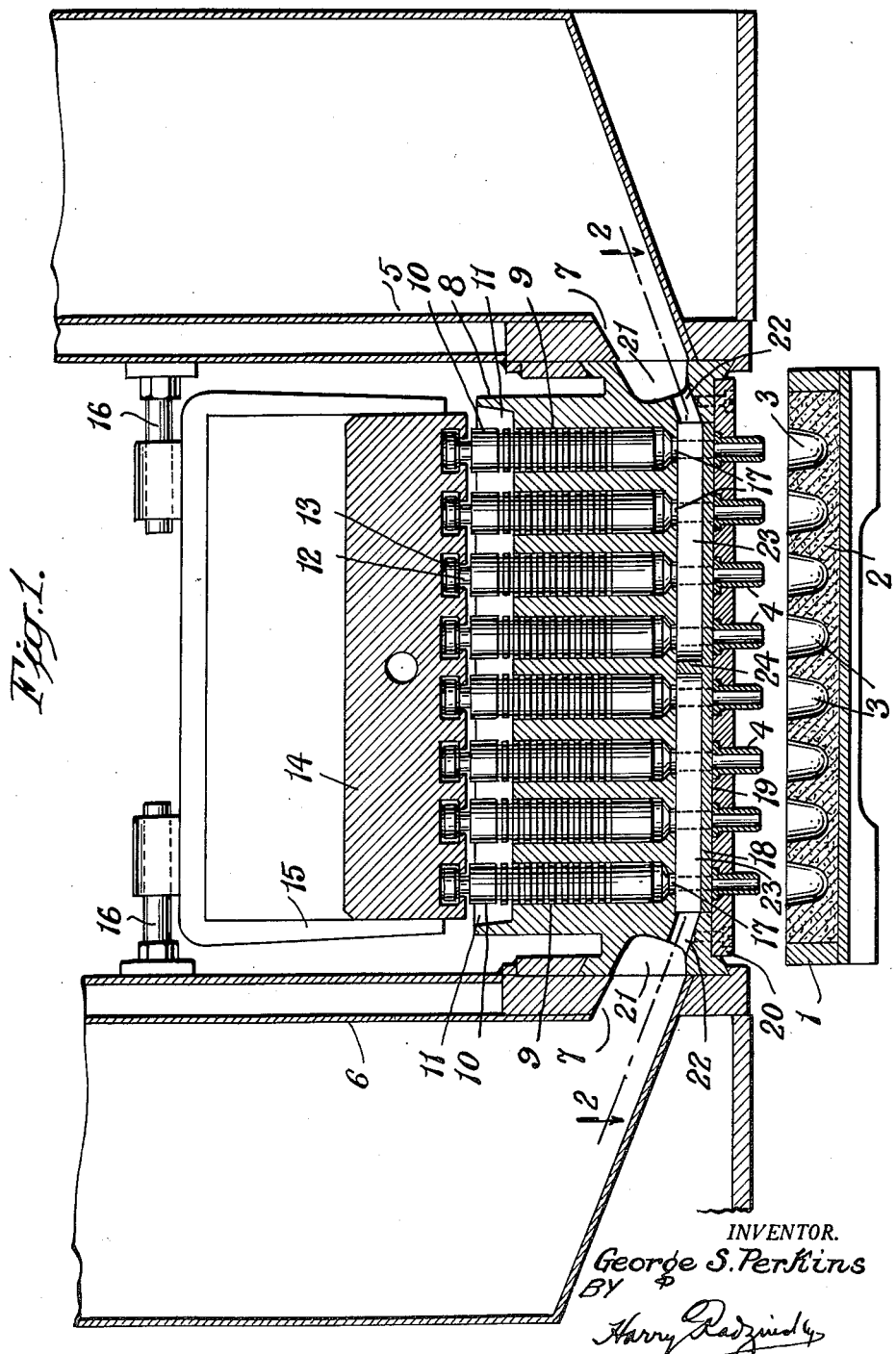
INVENTOR.
George S. Perkins
BY
Harry Radzwill
ATTORNEY May 20, 1952   G. S. PERKINS   2,597,175
DEPOSITOR FOR CONFECTIONERY MACHINES
Filed March 16, 1949   3 Sheets-Sheet 2
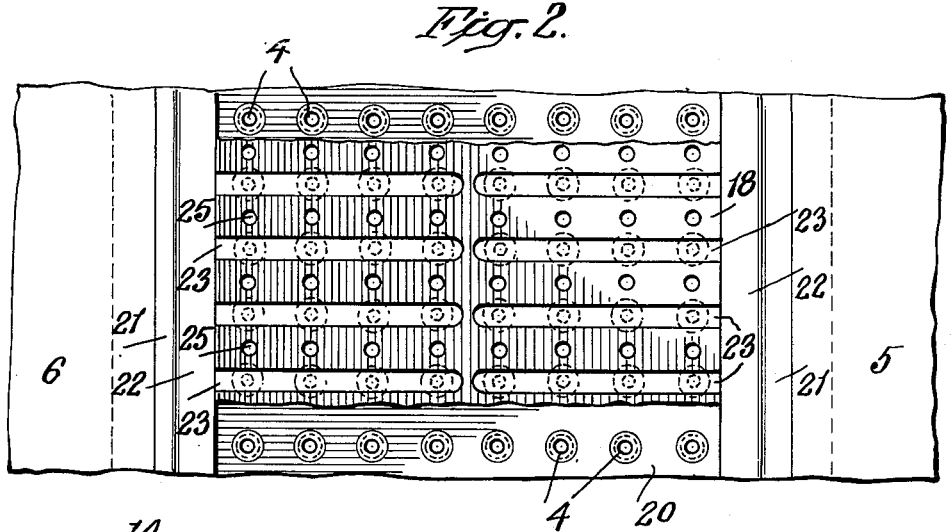
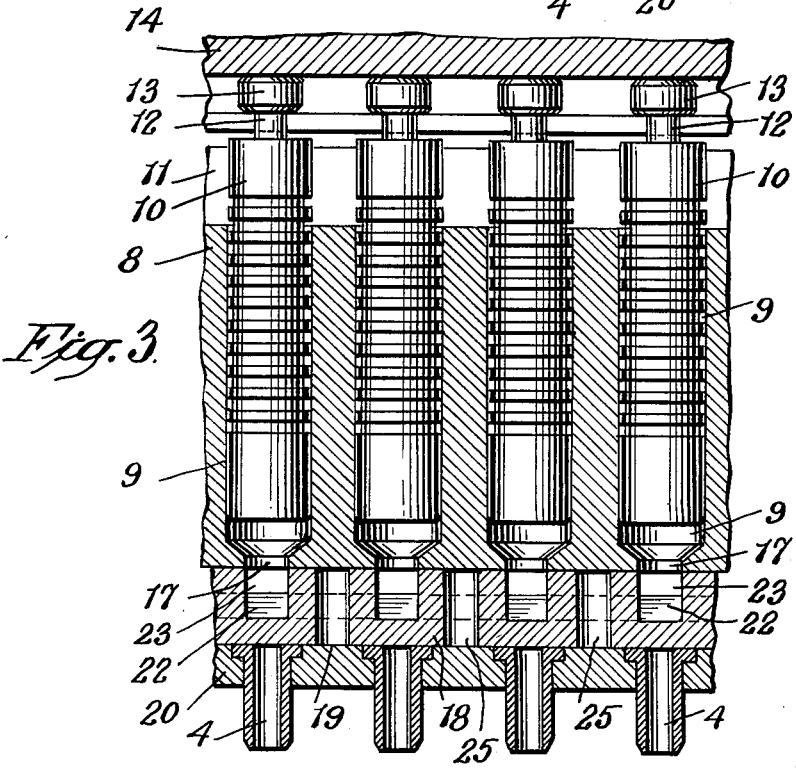
INVENTOR.
George S. Perkins
BY
Harry Redzinsky
ATTORNEY May 20, 1952 G. S. PERKINS 2,597,175
DEPOSITOR FOR CONFECTIONERY MACHINES
Filed March 16, 1949 3 Sheets-Sheet 3

INVENTOR.
George S. Perkins
BY
Harry Radzinsky
ATTORNEY

Patented May 20, 1952

2,597,175

UNITED STATES PATENT OFFICE 2,597,175

DEPOSITOR FOR CONFECTIONERY MACHINES

George S. Perkins, Kew Gardens, N. Y., assignor to National Equipment Corporation, New York, N. Y., a corporation of New York Application March 16, 1949, Serial No. 81,727

3 Claims. (Cl. 107—29)

This invention relates to confectionery-making machines and particularly to that type in which an apparatus known as a "depositor" is employed and by means of which the candy material in more or less fluid condition is deposited in predetermined amounts in cavities in mold or matrix material carried by trays.

The trays in which starch constituting matrix material, is contained and in which the mold cavities are imprinted, are carried by conveyor mechanism and are halted in position below one or more rows of nozzles from which the candy material is ejected in predetermined amounts by pistons operative above the nozzles. Since a tray containing the mold forms is provided with a substantial number of rows of mold cavities, and since there is generally utilized in machines of the known type, a relatively small number of rows of candy-depositing nozzles, the trays into which the candy material is deposited, must be moved intermittently or with a step-by-step movement to bring the successive rows of mold cavities below the rows of depositing nozzles. This requires the employment, in a machine of this character, of complex and expensive mechanism by means of which the intermittent, properly-registering movement of the tray with respect to the depositing nozzles will be had. Moreover, such mechanism must be provided with suitable adjustments by means of which a precise registry of the nozzles with the mold cavities is assured. In addition, by intermittent movement of the trays, the output of the machine is slowed and other objectionable characteristics are present.

The present invention contemplates the provision of a depositing mechanism by means of which all of the mold cavities in each tray will be simultaneously filled so that a single halt or pause in the movement of the tray at the filling or depositing station is all that is necessary to result in the complete filling of each tray with the candy material. By such an arrangement, the employment of mechanism for securing an intermittent forward movement of the tray under the nozzles will be dispensed with; the entire tray will be filled by a simultaneous ejection of material from all of the nozzles; the entire tray will be filled during a single halt or pause below the nozzles and the output of the machine will be greatly increased.

More particularly, the invention contemplates the provision of a filling or depositing mechanism which includes the utilization of a substantially large number of filling nozzles, the number thereof preferably corresponding to the number of mold cavities employed in the starch contents of the tray that is halted below the nozzles. By simultaneous operation of the pistons which control the flow from the depositing nozzles, all of the mold cavities are filled at the same time; a single halt of the tray beneath the nozzles is all that is required to result in the filling of all of the mold cavities in the tray, and after the filling of the cavities the tray is moved away to the next station in the machine.

Another object of the invention is to provide, in a machine of this character, means by which the supply of the candy material to a substantially large number of depositing nozzles is attained, such means residing in the utilization of a plurality of supply tanks from which the material is drawn in a direction toward the center of the cylinder block in which the pistons are operative, whereby the distance which the candy material is required to travel to reach the pump cylinders into which it is drawn by upward movement of the pistons is materially decreased and efficiency and accuracy of the amount of material received in each cylinder for subsequent ejection is assured.

These and other objects are attained by the invention, a more particular description of which will hereinafter appear and be set forth in the claims appended hereto.

Figure 5:
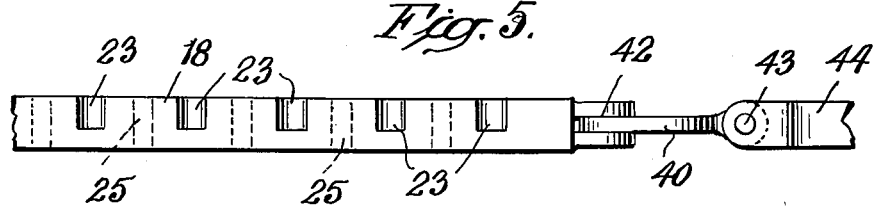

In the accompanying drawings, forming a part hereof, and in which an illustrative embodiment of the invention is disclosed, Fig. 1 is a vertical sectional view through a depositing mechanism constructed in accordance with the invention; Fig. 2 is a sectional view taken on the line 2—2 of Fig. 1, looking in the direction of the arrows; Fig. 3 is an enlarged, vertical sectional view through a portion of the apparatus, the view being taken at right angles to that of Fig. 1; Fig. 4 is a top plan view of a portion of the cut-off plate, and Fig. 5 is an edge view of the same, looking from the right of Fig. 4.

In a machine of the character to which the present invention relates, a number of trays such as indicated at 1 in Fig. 1, are successively carried by suitable conveyor mechanism through the machine, with pauses at the various stations at which the candy-making operations occur. At one of the stations, mold material, such as starch, shown in the tray at 2, is deposited into the tray, such material being subsequently imprinted to form the cavities 3 into which the candy material is deposited by the improved filling or depositing mechanism to be presently described. The cavities 3 are preferably equally spaced or according to the arrangement of the depositing nozzles, and are arranged in rows and when the tray is halted for the filling or depositing operation, each of the cavities will be disposed below a filling nozzle, the nozzles in a single row being shown at 4 in Fig. 1.

The candy material is ejected from these nozzles in predetermined quantities by pump means, and the material so ejected is supplied to such pump means from a pair of hoppers, shown respectively at 5 and 6. The hoppers 5 and 6 are similar and thus a description of one will suffice for both. Each hopper is provided in its front wall near the bottom, with an outlet opening 7 of slot-like form extending substantially from one end of the hopper to its other end. The pump housing or cylinder block is shown at 8, and the same is bored to provide a plurality of adjacent cylinders 9 in each of which is mounted a reciprocating piston 10. The particular pistons shown are of the so-called "hydro-sealed" type, and are each provided with a plurality of circumferential grooves into which a sealing fluid, such as water contained in the recess shown at 11, enters and acts as a sealing medium. Other types of pistons can, of course, be also successfully used.

At the top, each piston is provided with a stem 12 terminating in a head 13 engaged in an operating member 14 which is raised and lowered by suitable mechanism, in a guide 15 mounted on the studs 16 extending from the hoppers 5 and 6. This results in the entire group of pistons being raised and lowered in properly timed relation to the movements of a cut-off plate 18 to be described. The lower end of each of the cylinders 9 terminates in an outlet opening 17 of less diameter than the internal diameter of the cylinder, and said opening is adapted, at predetermined times, to register with ports extending through the cut-off plate 18 to be described.

Provided in the lower portion of the housing or cylinder block 8 is a chamber 19 in which the cut-off plate 18 is slidable, said cut-off plate being supported in place in said chamber 19 by means of a stationary closure plate 20 attached to the bottom of the pump housing or cylinder block 8 below the chamber 19. The closure plate is provided with the depositing nozzles 4 so positioned in the plate 20 that one of said nozzles is located directly below each of the cylinder outlets 17.

The pump housing or cylinder block 8 is supported between the hoppers 5 and 6 and at each side the housing is provided with an entrance opening or mouth 21 of slot-like formation which registers with the outlet slot 7 of the hopper. Said entrance opening or mouth 21 communicates with the cut-off plate chamber 19 by means of a slot-like opening 22 corresponding in length to the slot-like apertures 21 and 7 with which the slot 22 communicates.

The cut-off plate 18 constituting a valve means for the pumps, is shown more clearly in Fig. 4 and 5 wherein it will be noted that the same is in the form of a relatively flat plate closely fitting but slidable within the chamber 19 and having ports 23 which on the upstroke of the pistons are in communication with the registered inlet openings 7, 21 and 22. These ports 23 are in the form of grooves formed in the top of the plate and extending inwardly from the side edges of the cut-off plate 18 and separated at the center of the plate by the web 24. In other words, the groove-like ports 23 at right side of the plate 18 are fed from the hopper 5, while the grooves 23 at the left side are fed from the hopper 6. The grooves 23 constituting feed passages, are always in communication with the registered inlet openings 7, 21 and 22 regardless of whether said grooves 23 are in communication with the lower or outlet ends 17 of the cylinders or not. The sliding movements of the cut-off plate 18 are so timed that upon the rise or ascent of the pistons 10, the grooves 23 are positioned below the ends 17 of the cylinders and hence as the pistons rise the same draw up a charge of the candy material into each cylinder.

Located in the cut-off plate 18 between the slots 23 are discharge ports 25, the same being holes extending vertically completely through the cut-off plate 18 and positioned to be brought into registry with the ends 17 of the cylinders and the nozzles 4 below said ends 17. When the plate is moved to bring the discharge ports 25 into such position, the pistons then descend and force the material out of the cylinders, down through the ports 25 and out of the nozzles 4 and into the mold cavities in the tray then located below the nozzles. Since the number of pistons employed, and the nozzles below the same are equal to the number of cavities in each tray, it is obvious that upon the simultaneous descent of all of the pistons, all of the mold cavities 3 will be filled simultaneously. Hence an intermittent movement of the tray is unnecessary, a single pause below the depositor being all that is required to completely fill all of the cavities in the entire tray.

The cut-off bar is slidable to a relatively slight extent, and sufficient to shift the grooves 23 from below the cylinder outlets 17 and bring the discharge ports 25 into registration therewith and vice versa at the proper time. The means for shifting the cut-off plate is not herein shown, and the same may be any simple cam means connected to the yoke 40 attached to the cut-off plate 18 as shown at 41 and 42. An operating lever at 44 is coupled at 43 to yoke 40, said lever extending from the cam means. Some other equivalent operating means can of course be employed, by which the cut-off plate 18 will be shifted with properly timed movements. During the ascent of the pistons 10, the cut-off plate is so located that its grooves 23 communicate both with the cylinder outlet openings 17 and the registered slot-openings 7, 21 and 22, and hence is in communication with both of the hoppers 5 and 6 so that a charge of candy material from the hoppers is being drawn up into each cylinder 9 on this rising or suction movement of each piston 10. Since some of the pistons draw their charges from one hopper and some draw it from the second hopper, an equal distribution of the material is had and a uniform amount of material is drawn into each cylinder and later discharged therefrom.

When the pistons reach their highest position, the cut-off plate is then shifted to disalign the grooves 23 from the cylinder outlets 17 and this movement brings the discharge ports 25 into registry with both the outlets 17 and the nozzles 4. The pistons 10 are then moved downwardly and they force the charges of material out of the cylinders, down through the discharge ports 25 and out through the nozzles 4 into the cavities 3 in the mold starch 2 of the tray 1. It will be noted that while the depositor is discharging in the manner above described, and while the grooves 23 are cut off from communication with the cylinders, the open ends of these grooves nevertheless remain in constant communication with the interiors of the respective hoppers 5 and 6. Thus any agitating or pressure feed means employed within the hoppers and tending to force the contents thereof toward the outlet opening 7 will constantly maintain the slots 23 filled with such material. Accordingly, when the cut-off plate shifts from discharge position to feed position and the pistons begin their ascent or suction stroke, the material to be sucked up into each cylinder is presented right at the bottom opening 17 of each cylinder. This has been found very effective and results in a uniform amount of goods being drawn into and hence discharged from each cylinder.

By means of this arrangement described, the entire number of cavities in a tray may be filled by a single descent of the pistons; the use of mechanism for intermittently moving the tray while it is under the depositor is dispensed with; more accurate registry of the mold cavities with the outlet nozzles is attained and greater production is accomplished by the machine. Other advantages will be readily apparent to those skilled in this art.

Having described one embodiment of the invention, it is obvious that the same is not to be restricted thereto but is broad enough to cover all structures coming within the scope of the annexed claims.

What I claim is:

1. A depositor for confectionery machines comprising, a plurality of cylinders arranged in a number of rows, a piston mounted for vertical reciprocation in each cylinder, a fixed apertured plate located below the lower ends of the cylinders, said plate having an aperture located below each of the cylinders, a movable cut-off plate located between the apertured plate and the lower ends of the cylinders, said cut-off plate having a plurality of grooves in its upper face, said grooves each having an inner closed end located adjacent to the center line of the cut-off plate and having an outer open end opening at an edge of the said plate, said grooves being in two separate groups, the open ends of the grooves in one group being in constant communication with a first supply hopper, the open ends of the grooves in the second group being in constant communication with a second supply hopper, the cut-off plate having delivery openings extending through it between the grooves and adapted to be aligned with the cylinders and the apertures in the fixed plate when the grooves are disaligned with the lower ends of the cylinders.

2. A depositor for confectionery machines comprising a pair of hoppers arranged in spaced-apart relation, a housing situated between the hoppers and having a plurality of cylinders, a piston mounted for reciprocation in each cylinder, an outlet nozzle below each cylinder, a cut-off plate slidably mounted between the ends of the cylinders and the nozzles, said outlet plate having a plurality of grooves in its upper face, the grooves being arranged in two groups, the grooves in one group each having an open end located at one edge of the cut-off plate and disposed in constant communication with the outlet of one of the hoppers, said grooves being each closed at their opposite end, which closed ends are located adjacent to the center of the cut-off plate, the grooves in the second group being arranged in axial alignment with those in the first group and being open at one end at the second edge of the cut-off plate, the said grooves in the second group being closed at their inner ends adjacent to the center of the cut-off plate, the open ends of the grooves in the second group being in constant communication with the outlet of the second hopper, the cut-off plate being provided with discharge ports between the grooves, the cut-off plate being slidable to bring either the grooves or the ports into registry with the ends of the cylinders, the ports when so registered with the cylinders being also registered with the nozzles.

3. A depositor for confectionery machines comprising, a plurality of spaced cylinders in which pistons are mounted for reciprocating movement, a cut-off plate slidably mounted below the lower ends of the cylinders, said cut-off plate being provided with a plurality of spaced grooves in its upper face, said grooves having upper open sides facing the lower ends of the cylinders, the grooves being arranged in two groups, with each group arranged at one side of the center line of the plate, the grooves in one group being in axial alignment with those in the other group, the grooves in each group being open at one end and closed at the opposite end, the open ends of the grooves in one group being in constant communication with a hopper outlet, the open ends of the grooves in the second group being in constant communication with the outlet of a second hopper, the hoppers being spaced apart and the cylinders and cut-off plate being arranged between them, the cut-off plate being provided with delivery openings located between the grooves and adapted for alignment with the cylinders when the grooves are disaligned therewith.

GEORGE S. PERKINS.

REFERENCES CITED

The following references are of record in the file of this patent:

UNITED STATES PATENTS

| Number | Name | Date |
|---|---|---|
| 663,629 | Hoffman | Dec. 11, 1900 |
| 1,162,391 | Oppenheim | Nov. 30, 1915 |
| 2,032,812 | Quattrin | Mar. 3, 1936 |
| 2,080,298 | Bagby | May 11, 1937 |
| 2,115,799 | Brandt | May 3, 1938 |
| 2,127,850 | Taylor | Aug. 23, 1938 |
| 2,228,531 | Newman | Jan. 14, 1941 |